Jan. 4, 1944. F. E. SMITH 2,338,674
HOSE COUPLING COLLAPSING TOOL
Filed March 18, 1943 2 Sheets-Sheet 1
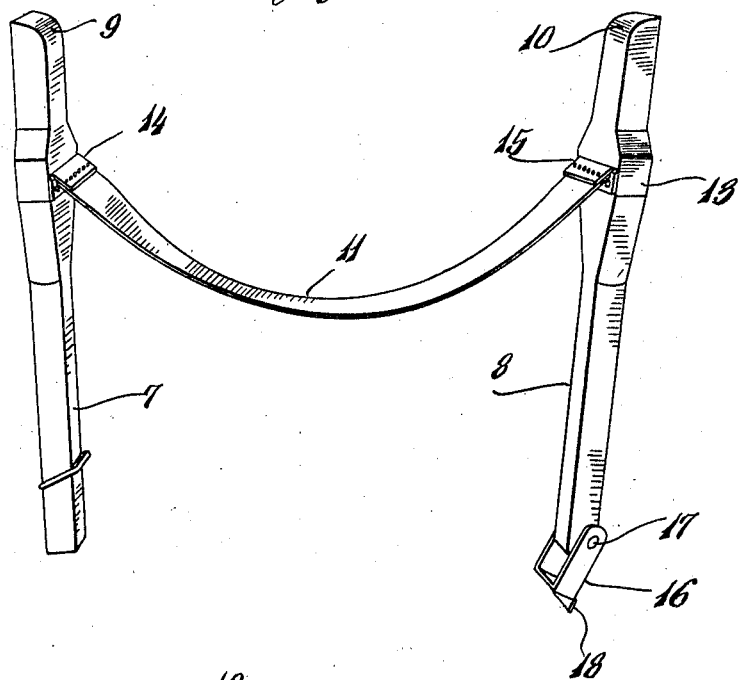
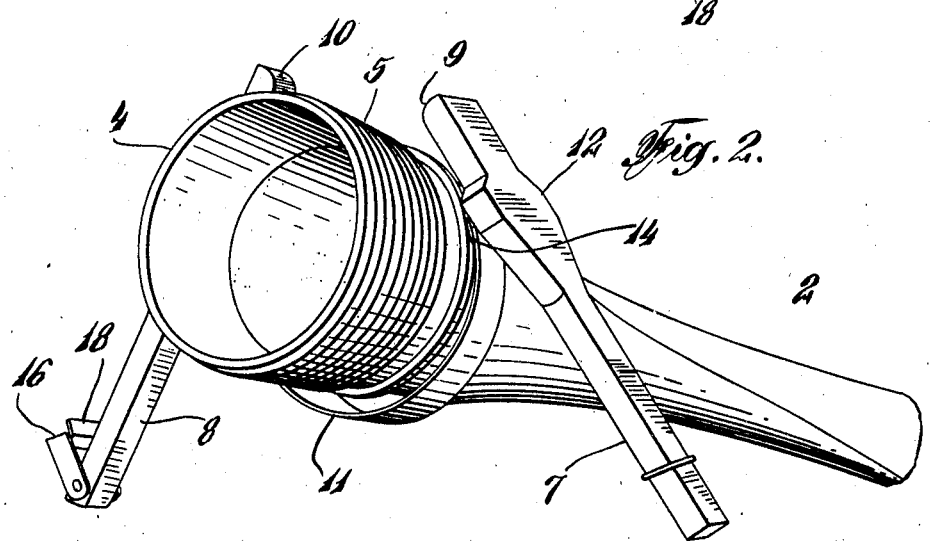
INVENTOR:
Franklin Elijah Smith
BY
Haseltine, Lake & Co.
ATTORNEYS

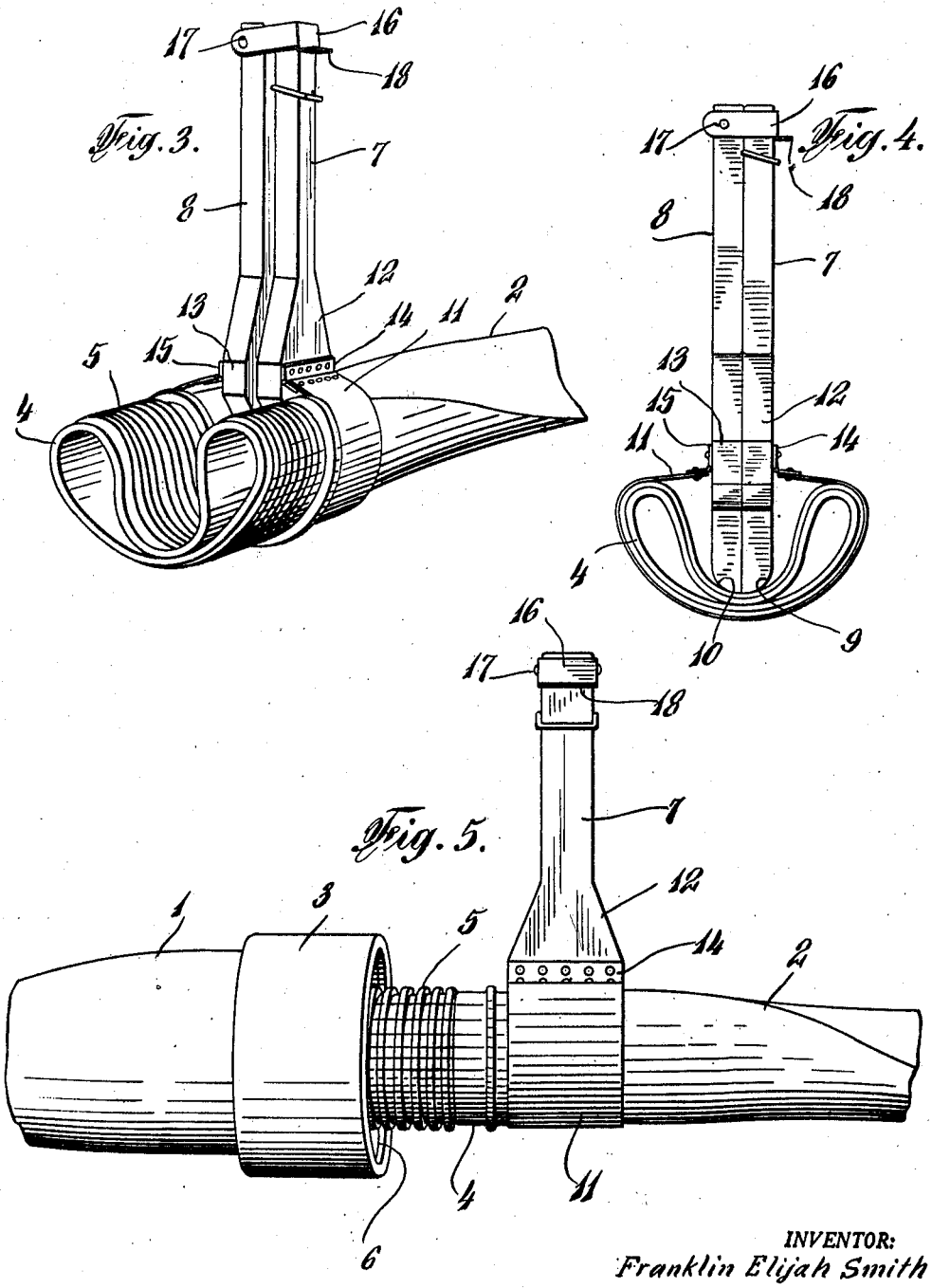

Patented Jan. 4, 1944

2,338,674

UNITED STATES PATENT OFFICE 2,338,674

HOSE COUPLING COLLAPSING TOOL

Franklin Elijah Smith, South Dartmouth, Mass.

Application March 18, 1943, Serial No. 479,541

7 Claims. (Cl. 294—103)

This invention relates to manual tools for gripping and collapsing portions of hose couplings, and especially for collapsing in a pre-determined manner a resiliently collapsible spigot member preparatory to insertion thereof into, or removal thereof from, a corresponding socket member of a hose coupling such as disclosed in my copending application Serial No. 454,526, filed August 12, 1942.

The main object of my invention is to facilitate manipulation of couplings of the indicated type, especially when of large diameter and difficult to collapse by applying the hands alone to the collapsible spigot portions involved.

Another object is to expedite making connections between, and laying hose sections in emergencies or over great distances.

A further object is to ensure proper collapsing of certain collapsible spigot portions of a hose coupling as mentioned, so that the collapsing will not injure the parts involved, and that the spigot portions will be accurately inserted into corresponding socket members before release therein so that the couplings will be properly assembled.

Other objects and the various advantages inherent in my invention and accruing from its practical application in the art will appear more fully in detail as this specification proceeds.

In order to render the invention clear and comprehensible at a glance, the same is illustrated in several positions in the accompanying drawings forming part hereof, and in which Figure 1 is a perspective view of a tool or appliance made according to the present invention and embodying the principles thereof in a practical form.

Figure 2 shows the tool or appliance in perspective as initially applied to a collapsible hose portion or spigot preparatory to collapsing said spigot in order to facilitate insertion thereof into a corresponding sleeve or socket member to form a temporary coupling.

Figure 3 is a perspective view of the tool and spigot when the latter has been fully collapsed.

Figure 4 is an end view of the same spigot showing the exact relations and positions of the parts of the tool with respect to the collapsed spigot.

Figure 5 depicts the manner in which the collapsed spigot is inserted into its corresponding rigid sleeve or socket member and manipulated to this end by means of the present tool.

Throughout the views the same or like parts are indicated by the same references.

When it is desired to couple sections of a large diameter hose, especially when the spigot portion of a joint or coupling adapted to be inserted into a corresponding sleeve portion of said coupling is of a collapsible character, it is desirable to have some means for resiliently collapsing said spigot member in a definite manner to avoid injuring the same, while ensuring the positive collapse thereof into smaller compass than usual so as to allow unobstructed insertion of the same into said socket member and also facilitating manipulation of the collapsed spigot member for this purpose.

Hence, it is proposed to utilize a tool or appliance definitely designed for this purpose which, in addition, will make certain that the handling of the couplings will be uniformly the same at all times.

Two hose sections 1 and 2 are preferably provided with a rigid and unyielding sleeve 3 forming a socket and a collapsible spigot 4, respectively, according to my copending application of Serial No. 442,646 filed May 12th, 1942, the spigot member being made of live rubber or other equivalent resilient material so that it may be temporarily collapsed for insertion into the socket member and there released to resume its normal shape in which the ribs 5 of the spigot member will engage in corresponding grooves 6 in the sleeve or socket member 3. If the hose involved is of small diameter it is frequently sufficient to press the hose into collapsed condition by means of the thumbs of the operator, but when a hose of large diameter is concerned, it is not easy to properly collapse the spigot member by hand and if it should be attempted, the spigot member may be collapsed into an irregular form or in an irregular manner causing damage to the same.

Thus the tool now used for collapsing the member consists of two elongated handles 7, 8 provided at their working ends with rounded portions 9, 10 and linked together intermediate the ends by means of a belt, strap, cord, or other flexible member 11. Each of the handle members has a widened section 12, 13 to which hinge means 14, 15 are preferably attached, a swinging leaf of each of said hinge means being attached to one end of the belt or strap 11. When it is desired to collapse a spigot 4 as indicated, it is but necessary to partly wrap belt 11 about the spigot on a suitable portion thereof as shown in Figure 2, while the rounded ends 9 and 10 of the handle members 7 and 8 are directed upwardly toward each other while the belt or strap 11 virtually forms a sling suspending the spigot member. If the outer ends of the handle members are raised in the directions indicated by the arrows, they will meet as shown in Figures 3 and 4 while the ends 9 and 10 of the tool will push down and bend the upper portion of the spigot member into the downwardly directed loop as may be seen best in Figures 3 and 4. In order to retain the tool in position upon the spigot, the swingable shackle 16 pivoted at 17 on handle member 8 is simply swung by its lug or finger-piece 18 over and about the end of handle member 7 as may also be noted in Figures 3, 4, and 5, to retain the latter.

It will then be found a simple matter to hold the spigot 4 by means of the tool and to insert the spigot thus collapsed into the hose sleeve or socket 3 when the tool may be released by raising the shackle 16 and separating the handle members so as to allow the spigot to expand into normal shape and assume an assembled relation within the sleeve 3 so as to form therewith the desired coupling.

The manipulation just described is very quickly performed, and in order to dissociate the spigot from the socket, it is merely necessary to place the tool in position on the spigot as already described with respect to Figure 2, and to manipulate the handle members and again collapse said spigot, thereafter withdraw the same from sleeve 3, after which the tool may again be released, when the spigot will be free and will instantly resume its normal round shape.

While hinged means have been shown for attaching the ends of belt or strap 11 to the handle members, it is not necessary to limit the invention to the use of hinge means, for any other practical means may be used for attaching the ends of said strap to the handle members. On the other hand, the shackle 16 may be replaced by a swingable hook, latch, or other retaining means, or a hook or latch may be built into or mounted upon one of the handle members and project partly into the other handle member in releasable manner when said handle members are brought together during operation. It may be mentioned further that the handle members may be modified in form or dimensions, may be made of wood, metal, alloys, or plastic material to suit the operator.

Other modifications and changes in dimensions or materials may be resorted to in the scope of my invention.

Having now fully described my invention, I claim:

1. A tool or appliance for manually collapsing a resiliently collapsible hollow member of a two-part coupling, including a pair of handle members or bars and a strip or belt of flexible material connected at the ends thereof with said handle members and capable of being wrapped about a portion of the perimeter of said hollow member so as to form a sling about the same, said handle members having portions capable of making direct compressive contact with said hollow member in effective positions to compress portions thereof and thereby cause collapsing of said member.

2. A tool or appliance for manually collapsing a resiliently collapsible hollow member of a two-part coupling, including a pair of handle members or bars and a strip or belt of flexible material connected at the ends thereof with intermediate portions of said handle members and capable of being wrapped about a portion of the perimeter of said hollow member so as to form a sling about the same, said handle members having portions capable of making direct compressive contact with said hollow member in effective positions to compress portions thereof and thereby cause collapsing of said member.

3. A tool or appliance for manually collapsing a resiliently collapsible hollow member of a two-part coupling including a pair of handle members or bars and a strip or belt of flexible material connected at the ends thereof with intermediate portions of said handle members and capable of being wrapped about a portion of the perimeter of said hollow member so as to form a sling about the same, said handle member having end portions making direct compressive contact with said hollow member in effective positions to compress portions thereof and thereby cause collapsing of said member, said end portions of said handle members being disposed upon one side of the strip or belt and having rounded ends adapted to press down upon and collapse the collapsible hollow member and prevent sharp bending or creasing of the same during the collapsing thereof.

4. A tool or appliance according to claim 1, having hinge means upon the handle members and the ends of the strip or belt attached directly to portions of said hinge means.

5. A tool or appliance according to claim 2, having retaining means upon one handle member adapting the same to be temporarily attached to the other handle member in close association therewith during operation.

6. A tool or appliance according to claim 3, having hinge means upon the handle members and the ends of the strip or belt secured at the ends thereof directly to portions of said hinge means, and a shackle means pivoted upon one handle member and adapted to be swung over upon and partly envelop a portion of the other handle member in operated positions.

7. A tool or appliance for manually collapsing a resiliently collapsible hollow member for a coupling including a pair of handle members or bars, an expanded or widened portion upon said handle members intermediate the ends thereof, a rounded portion upon one end of each of said handle members, and a strip or belt of flexible material connected at the ends thereof with said widened portions of the handle members so as to be capable of being partly wrapped about said hollow member so as to form a sling about the same, and the rounded ends of the handle members being adapted to bear down upon and depress a portion upon the hollow member in order to collapse the same, there being means for temporarily retaining the two handle members in close association while suspending the hollow member by said belt in collapsed condition of latter.

FRANKLIN ELIJAH SMITH.